United States Patent [19] [11] 4,445,661
Langmesser, Jr. et al. [45] May 1, 1984

[54] VERTICAL SEAT ADJUSTER ARRANGEMENT FOR VEHICLE SEATS

[75] Inventors: Otto J. Langmesser, Jr., Fraser; Richard W. A. Rees, West Bloomfield, both of Mich.

[73] Assignee: General Motors Corporation, Detroit, Mich.

[21] Appl. No.: 407,320

[22] Filed: Aug. 12, 1982

[51] Int. Cl.³ ...................... F16M 11/24; F16M 13/00

[52] U.S. Cl. .................................... 248/394; 248/396; 248/423; 297/325

[58] Field of Search ............... 248/394, 396, 397, 395, 248/419, 423; 297/325

[56] References Cited

U.S. PATENT DOCUMENTS

| | | | |
|---|---|---|---|
| Re. 25,225 | 8/1962 | Moritz et al. | 248/354 P |
| 2,609,029 | 9/1952 | Haberstump | 155/14 |
| 3,525,496 | 8/1970 | Colautti et al. | 248/394 |
| 3,552,707 | 1/1971 | Tanaka | 248/394 |
| 3,848,851 | 11/1974 | Elias | 248/354 P X |
| 3,894,708 | 7/1975 | Stanley | 248/394 |
| 4,010,927 | 3/1977 | Pickles | 248/420 |
| 4,190,225 | 2/1980 | Bauer et al. | 248/394 |
| 4,356,990 | 11/1982 | Sakurada et al. | 297/348 X |

FOREIGN PATENT DOCUMENTS

| | | | |
|---|---|---|---|
| 649595 | 11/1962 | Italy | 248/396 |
| 718310 | 2/1980 | U.S.S.R. | 248/394 |

*Primary Examiner*—J. Franklin Foss
*Assistant Examiner*—David L. Talbott
*Attorney, Agent, or Firm*—Herbert Furman

[57] ABSTRACT

A vertical seat adjuster arrangement for vehicle seats includes spaced opposite hand mechanisms, each of which includes a seat support bracket. The rear portions of the brackets are supported to the vehicle by levers which are conjointly rotatable through a screwjack mechanism to raise and lower the rear portions of the brackets. The front portions of the brackets are likewise supported to the vehicle by conjointly rotatable levers. Each bracket mounts a lock plate which is movable between engaged and released positions with respect to a detent mounted to the vehicle in order to lock the front portions of the brackets against movement. Each lock plate includes a series of alternating notches and abutments, with the notches of one locking plate being offset with respect to the other to thereby obtain an increased number of adjusted positions of the brackets relative to the vehicle.

4 Claims, 6 Drawing Figures

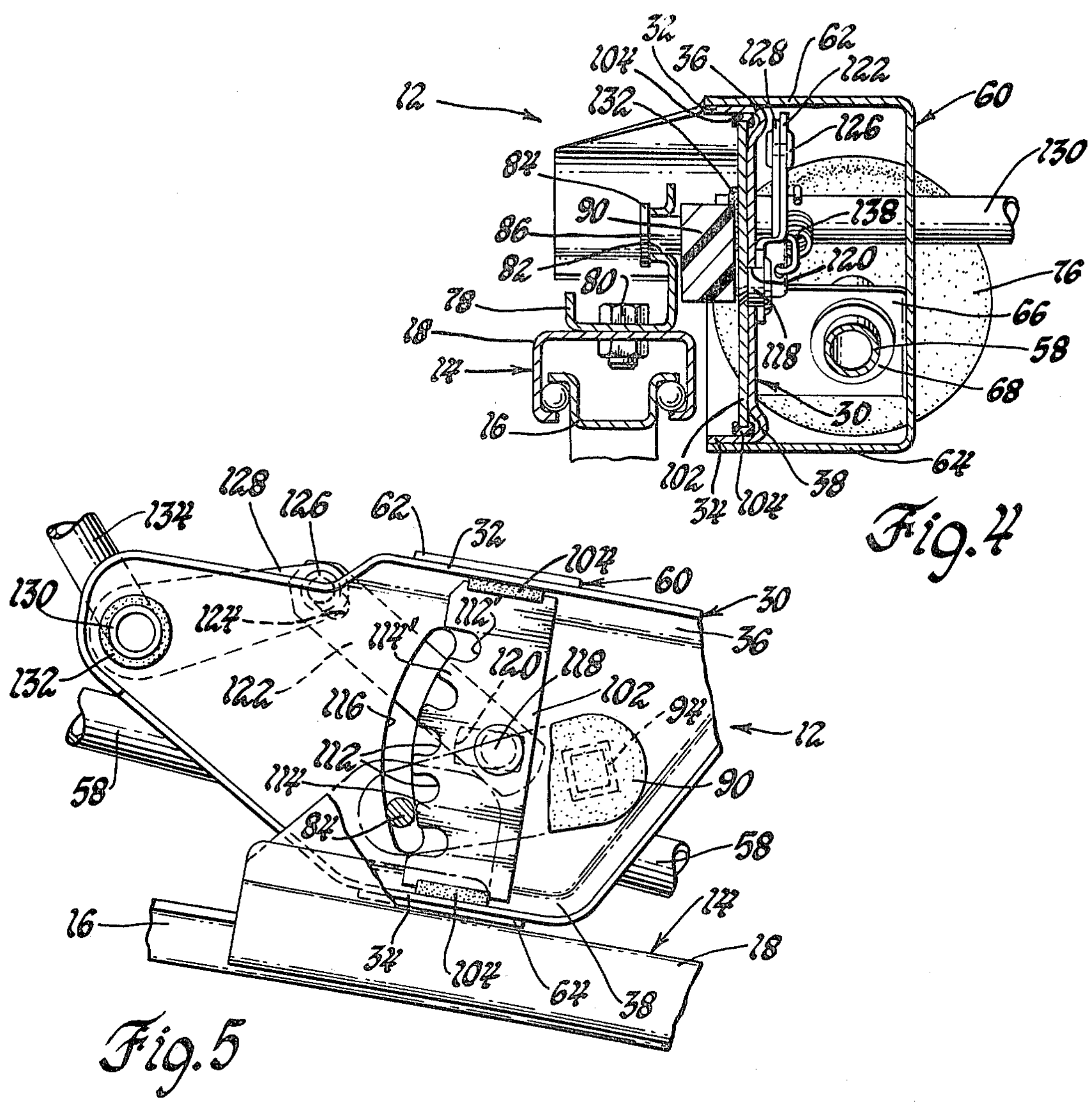
Fig.4
Fig.5
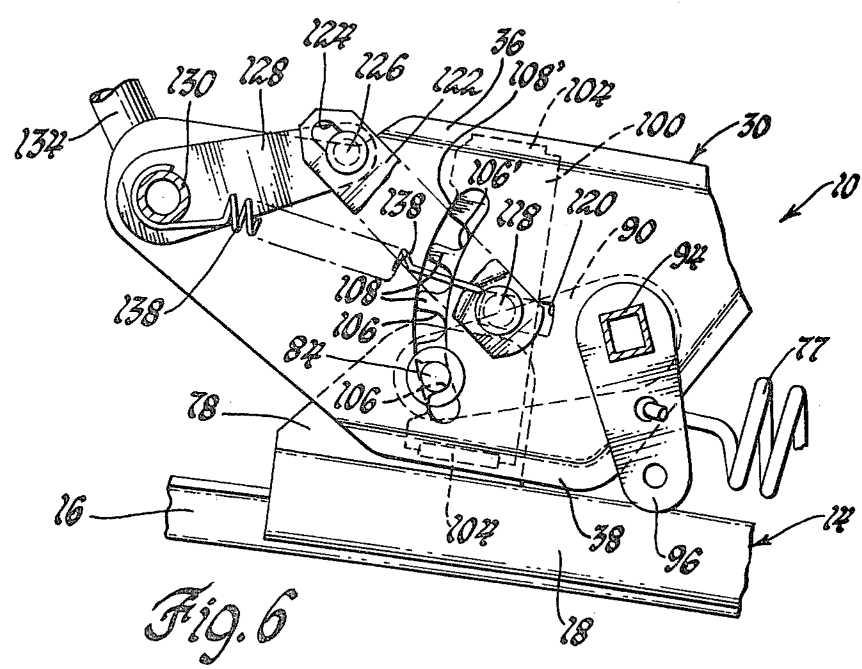
Fig.6

VERTICAL SEAT ADJUSTER ARRANGEMENT FOR VEHICLE SEATS

This invention relates generally to a vertical seat adjuster arrangement for vehicle seats and more particularly to such an arrangement for selectively manually adjusting the front or rear portion of a vehicle seat.

BACKGROUND OF THE INVENTION

The seat adjuster arrangement of this invention is similar to that shown in U.S. patent application Ser. No. 383,471, Vertical Seat Adjuster for Vehicle Seats, Richard W. A. Rees, filed June 1, 1982, and assigned to the assignee of this invention. Both seat adjuster arrangements include inboard and outboard seat adjuster mechanisms of different hand. Each mechanism obtains vertical adjustment of the front or rear portion of the seat through rotation of respective spaced front and rear levers which are pivoted both to a seat support bracket supporting the seat and to a relatively fixed respective vehicle pivotal connection. Conjoint rotation of the front and rear pairs of levers of the inboard and outboard mechanisms about their relatively fixed vehicle pivotal connections is assured by transfer tubes interconnecting the seat support bracket pivots of the levers. Such rotation raises and lowers the respective front and rear portions of the seat.

In the seat adjuster arrangement of this invention, a manually operable screwjack mechanism is coupled to the transfer tube interconnecting the rear levers to rotate such levers. The screwjack mechanism holds the rear portion of the seat in a vertically adjusted position. The front portion of the seat is vertically adjusted by the seat occupant shifting weight to rotate the front pair of levers about their relatively fixed vehicle pivotal connections.

In order to lock the front portion of the seat in a vertically adjusted position, the seat support brackets are each provided with a lock plate which is slidably mounted thereon for movement between engaged and released positions relative to a respective front vehicle pivotal connection which functions as a detent means for the lock plate. Each lock plate includes a series of alternating notches and teeth which respectively function as detent engaging means and detent abutting means. Each notch defines a vertically adjusted position of the seat. The notches and teeth of one lock plate are offset with respect to those of the other lock plate so that each notch of one lock plate corresponds to a tooth of the other lock plate. Thus, when a notch of one lock plate engages a respective detent means, a tooth of the other lock plate abuts a respective detent means whereby one lock plate is always engaged and the other lock plate is always released in a vertically adjusted position of the seat. However, the seat is locked in each vertically adjusted position since the front levers are coupled together for conjoint rotation by the front transfer tube. By providing alternating teeth and abutments which are offset with respect to each other, a greater number of vertically adjusted positions can be obtained than if the notches and teeth were aligned with respect to each other.

The primary feature of this invention is that is provides an improved seat adjuster arrangement for vehicle seats which includes like mechanisms having conjointly adjustable seat support brackets for supporting the seat and provided with respective locking means alternately engageable with respective detent means to lock the brackets in an adjusted position. Another feature is that each locking means is movable between engaged and released positions relative to a respective detent means, with one of the locking means being located in an engaged position with respect to its detent means and the other locking means being located in a released position with respect to its detent means in each adjusted position of the seat. A further feature is that the detent means are provided by relatively fixed vehicle pivotal connections of levers which are pivotally connected to the seat support brackets and are conjointly rotatable to adjust the brackets. Yet another feature is that the locking means includes a locking plate mounted to each bracket for movement between engaged and released positions, each locking plate having a series of alternating notches and teeth, the engagement of a notch with a respective relatively fixed pivotal connection locking a plate and the brackets in locked position and the abutment of a tooth with a relatively fixed pivotal connection locating a respective locking plate in released position. Yet a further feature is that a notch of one locking plate corresponds to an abutment of the other locking plate whereby the notches and abutments are laterally offset with respect to each other and the number of adjusted positions of the seat obtainable is equal to the number of notches and greater than if the notches were aligned with each other.

These and other features of the invention will be readily apparent from the following specification and drawings wherein:

FIG. 4 is a sectional view taken generally along line 4—4 of FIG. 2.

FIG. 5 is an enlarged view of a portion of FIG. 2, and

FIG. 6 is an enlarged view of a portion of FIG. 3.

Figure 1:
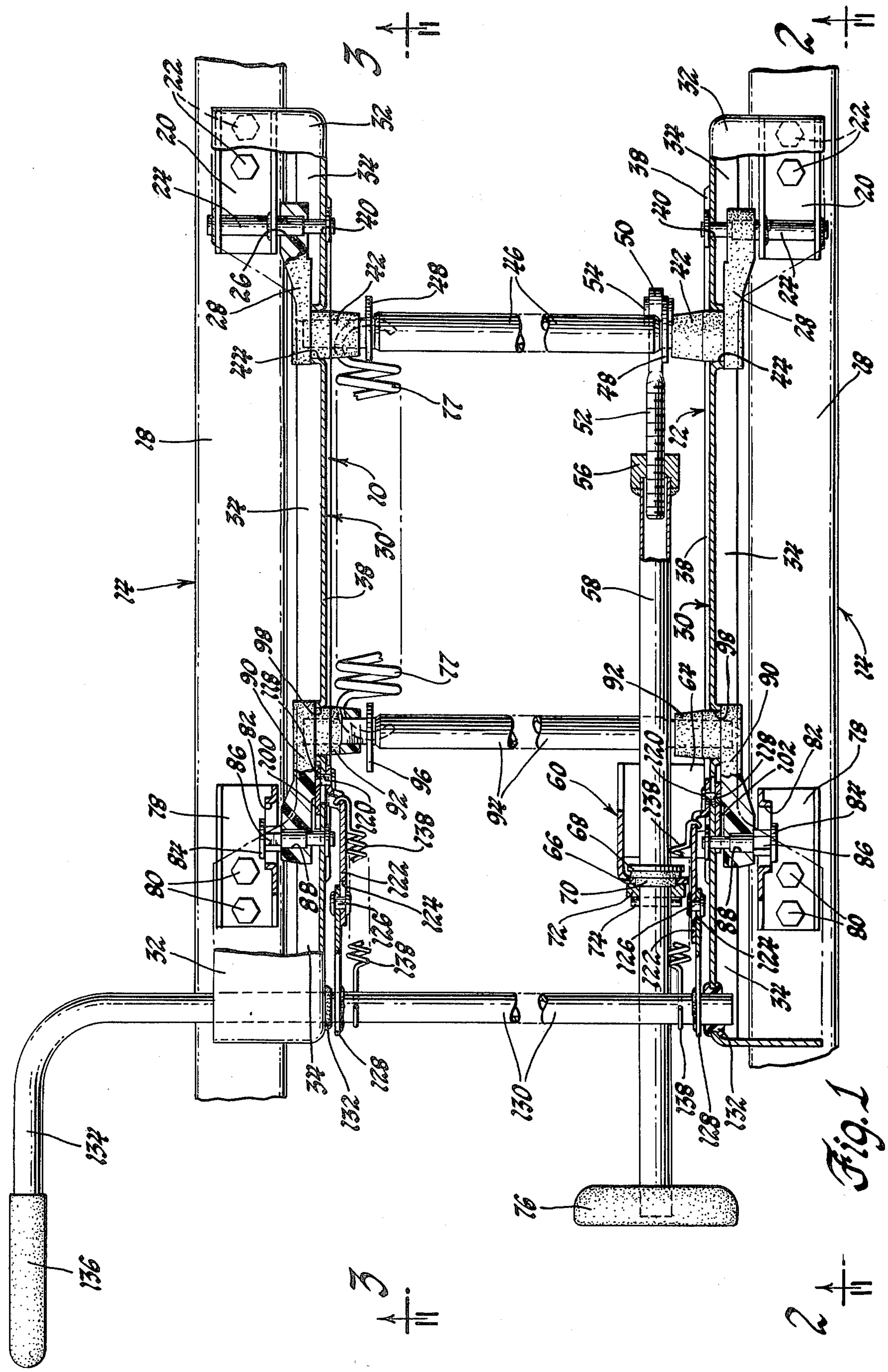
FIG. 1 is a partially broken away top plan view of a vertical seat adjuster arrangement according to this invention.

FIG. 1 shows the inboard and outboard opposite hand seat adjuster mechanisms 10 and 12 which provide the adjuster arrangement of this invention. It will be understood the adjuster mechanisms extend longitudinally of a vehicle seat under the outboard and inboard edge portions thereof. Since most of the parts of the mechanisms are common, the same numbers will be used for such common parts.

Figure 2:
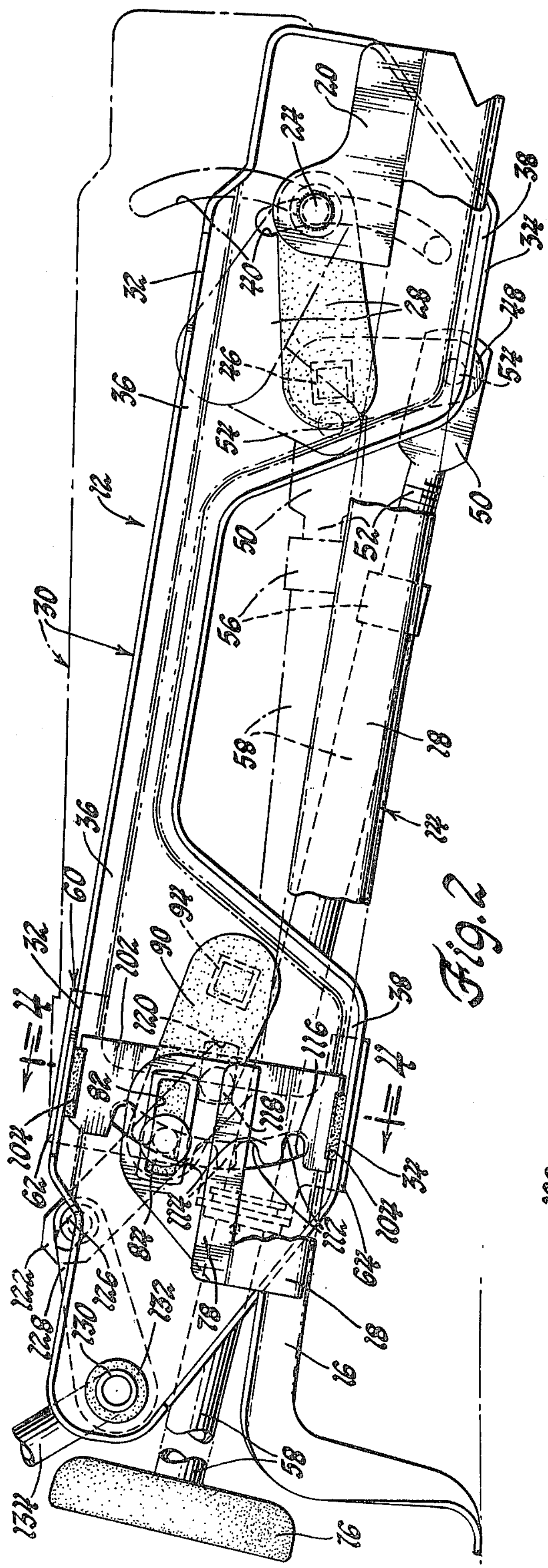
FIG. 2 is a view taken generally along line 2—2 of FIG. 1.
Figure 3:
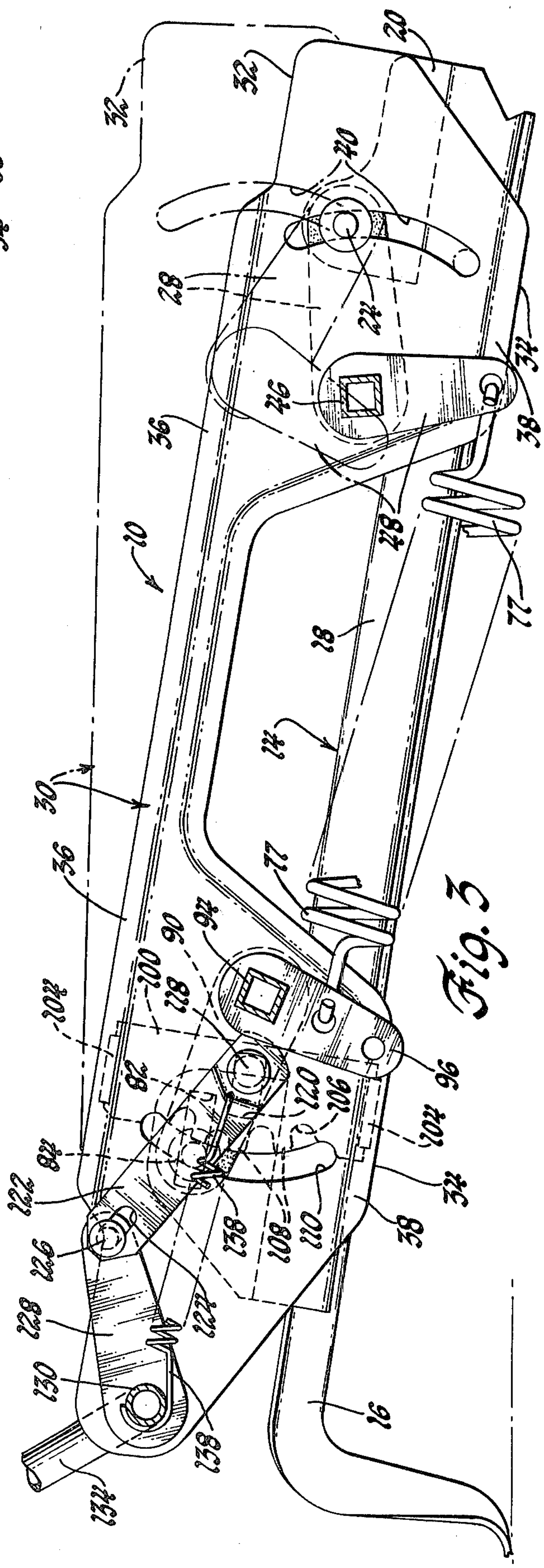
FIG. 3 is a view taken generally along line 3—3 of FIG. 1.

A conventional horizontal seat adjuster 14 is located inboard of mechanism 10 and outboard of mechanism 12. Each includes a lower track 16, FIGS. 2 and 3, fixedly mounted on the vehicle floor pan, not shown, and an upper track 18 horizontally adjustable relative thereto. The details of the horizontal adjuster 14 are not shown since any one of various known horizontal seat adjusters may be used. Reference may be made to U.S. patent application Ser. No. 318,133 filed Nov. 4, 1981, James R. Drouillard, Manually Operated Bucket Seat Adjuster, and assigned to the assignee of this invention for such a known adjuster.

A rear support bracket 20 is secured at 22, FIG. 1, to the upper track 18 of each adjuster 14. The bracket 20 is of channel shape and includes an aligned pair of upwardly extending apertured ears which receive and are welded to a shouldered pin 24, FIG. 1, a portion of which projects inwardly of the outboard bracket 20 and outwardly of the inboard bracket 20. The projecting portion of each pin is received through a shouldered bore 26, FIG. 1, in one end of a rear seat support lever 28 to thereby rotatably mount the levers 28 on the vehicle through the adjusters 14. A seat support bracket 30 extends longitudinally of each adjuster 14 beneath the inboard and outboard edges of the seat. Each bracket includes a continuous laterally extending peripheral flange having upper front and rear flange portions 32 which overlie brackets 20, FIG. 1, and are conventionally secured to the seat, and lower front and rear flange portions 34. A linear strengthening bead 36 is provided at the juncture of the bracket 30 and flange portions 32 and a like bead 38 is provided at the juncture of the bracket 30 and the flange portions 34. The beads 36 and 38 run between both of the flange portions 32 and 34. Each bracket 30 includes an arcuate closed slot 40 which receives the projecting portion of a respective pin 24.

As shown in FIG. 1, the other end of each lever 28 includes an integral tubular extension 42 which extends through a flanged opening 44 in a respective bracket 30. Each extension includes a generally square cross-section bore which receives a like shaped end of a transfer tube 46 which extends transversely underneath the rear of the seat and ties the inboard and outboard rear seat support levers 28 together for conjoint rotation about a respective pin 24 to raise and lower the rear portion of brackets 30 and of the seat. Slots 40 are generated about the axis of openings 44 and tube 46. A counterbalance lever 48 has a square shaped opening in its upper end which is slidably and non-rotatably received on each end of tube 46 to couple the levers 48 to the tube 46.

The flattened end 50 of a jackscrew 52 is pivotally secured at 54 to the outboard counterbalance lever 48. The jackscrew 52 is threadedly received through a nut 56 which is counterbored to receive and be secured to the rear end of a tube 58, FIG. 1. A generally U-shaped bracket 60, FIGS. 1, 2, and 4, has upper and lower integral legs 62 and 64 respectively, welded to the upper and lower front flange portions 32 and 34 of the outboard bracket 30 to mount the bracket 60 thereto. The bracket 60 further includes an integral apertured front leg 66 having its end secured to the bracket 30. The tube 58 extends through the aperture of the leg 66. A washer 68 is fixed to the tube and backs up a stepped plastic bushing 70 which rotatably mounts the tube 58 in the aperture of leg 66. A recessed bushing 72 extends over the forward end of the bushing 70 and the bushings 70 and 72 are clamped to each other and to the leg 66 by the washer 68 and a pin 74 extending through the tube 58. The tube 58 extends forwardly of the front edge of the vehicle seat and is provided with a handle 76 for manual rotation by a seated occupant.

When the handle 76 is turned to rotate the tube 58 and nut 56, the jackscrew 52 is extended and retracted relative to the tube to rotate the outboard counterbalance lever 48. This lever conjointly rotates the tube 46 and the inboard counterbalance lever 48. The tube 46 conjointly rotates the inboard and outboard levers 28 about their respective pivots on the projecting portions of the pins 24 to simultaneously raise and lower the rear portions of both brackets 30 as the slots 40 thereof move relative to the projecting portions of the pins 24. Thus, the rear portion of the seat may be raised, as indicated in dash lines in FIGS. 2 and 3, or lowered. A counterbalance spring 77 hooked to the inboard counterbalance lever 48 assists in the raising of the seat and resists the lowering of the seat.

A channel shaped front support bracket 78 is secured at 80 to the upper track 18 of each adjuster 14. The inboard leg of the outboard bracket and outboard leg of the inboard bracket include a flanged horizontal slot 82 best shown in FIG. 1. A shouldered pin 84 includes a double D portion 86 which is received within the slot 82 to mount a pin to each bracket 78 for horizontal sliding movement relative thereto. Each pin projects from the slotted leg of a respective bracket 78 and is received in a shouldered bore 88 in one end of a respective front seat support lever 90 which is the same as the rear seat support levers 28. Pins 84 thus rotatably mount the levers 90 to the horizontal seat adjuster 14 and to the vehicle. Each lever 90 further includes an integral tubular extension 92 having a square shaped bore which receives one square shaped end of a front transfer tube 94 which is the same as the tube 46. Tube 94 thus ties the inboard and outboard levers 90 to each other for conjoint rotation. A front counterbalance lever 96 which is the same as the rear counterbalance levers 48 is slidably and non-rotatably mounted on the inboard end of the tube 94. The counterbalance lever 96 is hooked to the forward end of the counterbalance spring 77. The extensions 92 of the levers 90 are rotatably received in respective flanged openings 98 of the support bracket 30, FIG. 1.

Inboard and outboard lock plates 100 and 102, respectively, mount plastic shoes 104 on the upper and lower edges thereof to slidably and non-rotatably mount such lock plates between the front upper and lower flange portions 32 and 34 of each bracket 30, FIG. 4. The inboard lock plate 100 includes a series of four notches 106 separated by teeth or abutments 108 which overlie an arcuate closed slot 110 of the inboard bracket 30. The outboard lock plate includes a series of five notches or grooves 112 separated by teeth or abutments 114 which overlie an arcuate closed slot 116 of the outboard bracket 30. The end portions of pins 84 project through respective slots 110 and 116 and are received either in a notch 106 or 112 or against a tooth 108 or 114, as will be described. The projecting portions of the pins 84 function as detents for the lock plates.

A headed pin 118 is fixed to each lock plate 100 and 102 and movable within an elongated horizontal slot 120 in each bracket 30 to guide sliding movement of the lock plates 100 and 102 relative to a respective bracket 30 between locked and released positions.

The offset end of a link 122 is pivotally secured to each pin 118 on the side of bracket 30 opposite the side on which the lock plates 100 and 102 are located. The other end of the link 122 is slotted at 124 and receives a pin 126 of a lever 128 to pivotally and slidably secure each link 122 to a respective lever 128. As shown in FIG. 1, the levers 128 are fixed to a tube 130 which is rotatably mounted in bushings 132 in each of the brackets 30. The tube 130 includes an integral lateral extension 134 which is located to the inboard side of the vehicle seat and extends forwardly thereof and mounts a handle 136 for manual actuation by a seated occupant. A tension spring 138 is hooked between tube 130 and a respective link 122 to continually bias the respective link 122 forwardly of a respective bracket 30 and in turn bias a respective lock plate 100 or 102 forwardly or to the left as viewed in FIGS. 5 and 6 toward a respective pin 84.

It will be recalled that the inboard lock plate 100 includes four notches 106 separated by teeth 108, FIG. 6, while the outboard lock plate 102 includes five notches 112 separated by teeth 114, FIG. 5. The teeth and notches are formed on an arc having its center at the axis of the transfer tube 94. The notches and teeth of lock plate 100 are laterally offset or are intermediate the notches and teeth of lock plate 102 whereby the notches and teeth of the lock plates are selectively and alternately engageable with their respective pins 84. Thus, the uppermost notch 112' of lock plate 102, FIG. 5, is aligned with the uppermost tooth 108' of lock plate 100, FIG. 6. The uppermost tooth 114' of lock plate 102, FIG. 5, is aligned with the uppermost notch 106' of lock plate 100, FIG. 6. Thus, at each vertical position of the front portion of the seat, only one of the notches 112 or 106 engages a respective pin 84 to lock the seat in such vertical position, while the other of the teeth 114 or 108 engages a respective pin 84. By locating the notches and teeth laterally offset to each other, the seat can be provided with approximately twice as many vertically adjusted positions as could be provided if the notches and teeth were laterally aligned with respect to each other.

When the front portion of the seat is in the vertical position shown in FIGS. 5 and 6, the lowermost tooth 114 of lock plate 102 engages or abuts its respective pin 84 while the lowermost notch 106 of lock plate 100 receives or engages its respective pin 84. Lock plate 102 is thus located in released position while lock plate 100 is located in engaged or detented position relative to a respective pin 84. Pin 126 of the outboard lever 128 is located adjacent the forward end of slot 124 of a respective link 122 while pin 126 of the inboard lever 128 is located adjacent the rearward end of a respective slot 124. Pin 118 of lock plate 102 is adjacent the rearward end of a respective slot 120 while pin 118 of lock plate 100 is adjacent the forward end of a respective slot 120. If it is desired to raise the front portion of the seat, the handle 136 is manually grasped and moved rearwardly of the seat to rotate the tube 130 clockwise as viewed in FIGS. 5 and 6. The pin 126 of the outboard lever 128 will move within the slot 124 of its respective link 122 to the rearward end thereof to maintain the lock plate in released position against the bias of spring 138. The pin 126 of the inboard lever 128 will move its respective link 122 rearwardly to move the lock plate 100 rearwardly or to the right as viewed in FIG. 6 to released position against the bias of spring 138. This disengages the notch 106 of lock plate 100 from its respective pin 84. The front portion of the seat is thus released for vertical upward movement as the occupant shifts weight to conjointly rotate the levers 90 through tube 94 about their respective pivots to the pins 84 and in turn conjointly raise the front portion of the brackets 30 and raise the front portion of the seat. When the seat reaches its desired vertically raised position, the handle 136 is released and the springs 138 bias both of the links 122 and lock plates 100 and 102 forwardly of the seat. Depending on the position of the seat, either lock plate 100 or 102 will move to engaged position while the other will remain in released position. A notch of one lock plate engages a respective pin 84 to lock the seat in the vertically raised position, while a tooth of the other lock plate will engage its respective pin 84. Thus, in any vertical adjusted position of the front portion of the seat, one lock plate will always be in locked position while the other will be in a released position, with this alternate location of the lock plates in locked and released positions being permitted by the pin and slot connection 124, 126 between the links 122 and levers 128.

During the vertical movement of the front portion of the seat, the rear portion of the seat pivots about the pins 24 as the pins 118 move in the slots 120. Likewise during vertical movement of the rear portion of the seat, the seat pivots about the pins 118 as they again move within the slots 120.

Thus this invention provides an improved vertical seat adjuster for selectively manually adjusting the front or rear portion of a vehicle seat.

The embodiments of the invention in which an exclusive property or privilege is claimed are defined as follows:

1. A seat support arrangement for mounting a vehicle seat on a vehicle for vertical adjustment thereof relative to the vehicle comprising, in combination, a pair of laterally spaced elongate seat supports for supporting the seat, first and second pivot means respective to each seat support, vertical adjustment means interconnecting a first portion of each seat support and the first pivot means respective to such seat support, means pivotally mounting a second portion of each seat support to a respective second pivot means, means conjointly operating the vertical adjustment means to conjointly vertically adjust the first portions of the seat supports as the second portions of the seat supports rotate relative to respective second pivot means, locking means respective to each seat support, each locking means including a series of detent means separated by abutment means, the detent means of one locking means being respective to an abutment means of the other locking means and collectively representing a vertical position of the seat supports, means mounting each locking means on a respective seat support for movement therewith and movement relative thereto between: (1) a locked position wherein the detent means of one locking means engages a respective first pivot means and the abutment means of the other locking means engages a respective first pivot means to lock both seat supports in the vertical position represented thereby, and (2) a released position wherein both locking means are disengaged from respective first pivot means to permit movement of the seat supports to a different vertical position, the seat supports being located in such different position by the engagement of the detent means of one of the locking means and the abutment means of the other of the locking means with a respective first pivot means, means biasing both locking means toward locked position, and release means for conjointly moving both locking means to released position.

2. A seat support arrangement for mounting a vehicle seat on a vehicle for vertical adjustment thereof relative to the vehicle comprising, in combination, a pair of laterally spaced elongate seat supports for supporting the seat, a first pivot pin and a second pivot means respective to each seat support, vertical adjustment means interconnecting a first portion of each seat support and the first pivot pin respective to such seat support, means pivotally mounting a second portion of each seat support to a respective second pivot means, means conjointly operating the vertical adjustment means to conjointly vertically adjust the first portions of the seat supports as the second portions of the seat supports rotate relative to respective second pivot means, locking means respective to each seat support, each locking means including a series of detent notches separated by abutment shoulders, the detent notches of one locking means being respective to an abutment shoulder of the other locking means and collectively representing a vertical position of the seat supports, means mounting each locking means on a respective seat support for movement therewith and movement relative thereto between: (1) a locked position wherein the detent notch of one locking means engages a respective first pivot pin and the abutment shoulder of the other locking means engages a respective first pivot pin to lock both seat supports in the vertical position represented thereby, and (2) a released position wherein both the detent notch and abutment shoulder are disengaged from respective first pivot pins to permit movement of the seat supports to a different vertical position, the seat supports being located in such different position by a detent notch of one of the locking means and the abutment shoulder of the other of the locking means with a respective first pivot pin, means biasing both locking means toward locked position, and release means for conjointly moving both locking means to released position.

3. A seat support arrangement for mounting a vehicle seat on a vehicle for vertical adjustment thereof relative to the vehicle comprising, in combination, a pair of laterally spaced elongate seat supports for supporting the seat, each including a vertically extending slot in a first portion thereof, a first pivot pin and a second pivot means respective to each seat support, the pivot pin extending through the slot, vertical adjustment means interconnecting a first portion of each seat support and the first pivot pin respective to such seat support, means pivotally mounting a second portion of each seat support to a respective second pivot means, means conjointly operating the vertical adjustment means to conjointly vertically adjust the first portions of the seat supports as the second portions of the seat supports rotate relative to respective second pivot means, a locking plate mounted on each seat support for movement between locked and released positions each locking plate including an edge portion having a series of detent notches separated by abutments, the notches of one locking plate being respective to the abutments of the other locking plate and each pair of notches and abutments collectively representing a vertical position of the seat supports, the detent notch of one locking plate engaging a respective first pivot pin and the abutment of the other locking plate engaging a respective first pivot pin to lock both seat supports in the vertical position represented thereby when the locking plates are in locked position, means biasing both locking plates toward locked position, and release means for conjointly moving both locking plates to released position wherein both the detent notch and abutment are disengaged from their respective first pivot pins to permit movement of the seat supports to a different vertical position, the seat supports being located in such different position by the engagement of the detent notch of one of the locking plates and the abutment of the other of the locking plates with a respective first pivot pin.

4. A seat support arrangement for mounting a vehicle seat on a vehicle for vertical adjustment thereof relative to the vehicle comprising, in combination, a pair of laterally spaced elongate seat supports for supporting the seat, each including a vertically extending arcuate slot in a first portion thereof, a first pivot pin and second pivot means respective to each seat support, the pivot pin extending through the slot, vertical adjustment means interconnecting a first portion of each seat support and the first pivot pin respective to such seat support, means pivotally mounting a second portion of each seat support to a respective second pivot means, means conjointly operating the vertical adjusting means to conjointly vertically adjust the first portions of the seat supports as the second portions of the seat supports rotate relative to respective second pivot means, a locking plate mounted on each seat support for movement between locked and released positions relative to a respective first pivot pin, each locking plate including an arcuate edge matching that of the slot and having an alternating series of detent notches separated by abutments, the detent notches of one locking plate being respective to the abutments of the other locking plate and each respective pair of notches and abutments collectively representing a vertical position of the seat supports, the detent notch of one locking plate engaging a respective first pivot pin and the abutment of the other locking plate engaging a respective first pivot pin to lock both seat supports in the vertical position represented thereby when the locking plates are in locked position, means biasing both locking plates to locked position, and release means for conjointly moving both locking plates to released position to disengage the detent notch and abutment from their respective first pivot pins and permit vertical adjustment of the seat supports.

* * * * *